(12) United States Patent
Sun et al.

(10) Patent No.: US 9,705,742 B2
(45) Date of Patent: Jul. 11, 2017

(54) METHOD AND APPARATUS FOR ENABLING M2M SERVICE AND H2H SERVICE TO COEXIST

(71) Applicant: ZTE CORPORATION, Shenzhen, Guangdong Province (CN)

(72) Inventors: Aifang Sun, Shenzhen (CN); Chong Gao, Shenzhen (CN); Zhihao Ling, Shenzhen (CN); Jian Bao, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/035,589

(22) PCT Filed: Mar. 3, 2014

(86) PCT No.: PCT/CN2014/072788
§ 371 (c)(1),
(2) Date: May 10, 2016

(87) PCT Pub. No.: WO2014/183493
PCT Pub. Date: Nov. 20, 2014

(65) Prior Publication Data
US 2016/0277240 A1    Sep. 22, 2016

(30) Foreign Application Priority Data
Nov. 12, 2013  (CN) .......................... 2013 1 0561316

(51) Int. Cl.
*H04L 12/24* (2006.01)
*H04W 4/00* (2009.01)
(Continued)

(52) U.S. Cl.
CPC ........ *H04L 41/0813* (2013.01); *H04L 47/805* (2013.01); *H04W 4/005* (2013.01); *H04W 28/24* (2013.01)

(58) Field of Classification Search
CPC ............... H04L 41/0813; H04L 47/805; H04L 41/0836
See application file for complete search history.

(56) References Cited

U.S. PATENT DOCUMENTS

| | | | |
|---|---|---|---|
| 9,363,839 B2 * | 6/2016 | Zhao | H04W 28/24 |
| 2011/0310769 A1 * | 12/2011 | Lee | H04W 4/005 370/254 |

(Continued)

FOREIGN PATENT DOCUMENTS

| | | |
|---|---|---|
| CN | 102438294 A | 5/2012 |
| CN | 102469547 A | 5/2012 |

(Continued)

OTHER PUBLICATIONS

International Search Report issued Aug. 19, 2014 in PCT Patent Application No. PCT/CN2014/072788.
(Continued)

*Primary Examiner* — Jerry Dennison
(74) *Attorney, Agent, or Firm* — Plumsea Law Group, LLC

(57) ABSTRACT

A method and an apparatus for a coexistence of an M2M service and an H2H service relate to the technical field of wireless communication. The method includes: during an implementation of an M2M service, determining whether the M2M service is a QoS negotiable M2M service by checking a type of the M2M service; when it is determined that the M2M service is a QoS negotiable M2M service, making the M2M service and an H2H service to share same network resources; and when it is determined that the M2M service is a QoS non-negotiable M2M service, configuring, for the M2M service, a dedicated cell dedicated to implement the M2M service, wherein, the M2M service is a machine to machine service, and the H2H service is a human to human service.

17 Claims, 3 Drawing Sheets

(51) Int. Cl.
*H04L 12/927* (2013.01)
*H04W 28/24* (2009.01)

(56) References Cited

U.S. PATENT DOCUMENTS

2012/0033613 A1* 2/2012 Lin ..................... H04W 74/085
                                                                  370/328
2012/0117140 A1   5/2012 Wang et al.
2014/0349660 A1* 11/2014 Abdalla ................ H04W 4/005
                                                                  455/450
2016/0277240 A1*  9/2016 Sun ....................... H04W 4/005

FOREIGN PATENT DOCUMENTS

| CN | 102484765 A | 5/2012 |
| WO | 2014163493 A1 | 11/2014 |

OTHER PUBLICATIONS

Written Opinion issued Aug. 19, 2014 in PCT Patent Application No. PCT/CN2014/072788.
Extended European Search Report issued Oct. 10, 2016 for EP Application No. 14798465.2.
"Solutions for MTC Overload Control for LTE," Nokia Corporation et al., 3GPP draft, Madrid, Spain, vol. RAN WG2, retrieved Aug. 17, 2010, section 2.
"Consideration on the Impact of Application Level Distribution on MTC," HUAWEI, 3GPP draft, Stockholm, Sweden, vol. RAN WG2, retrieved Jun. 21, 2010, sections 2.2 and 2.3.

* cited by examiner

METHOD AND APPARATUS FOR ENABLING M2M SERVICE AND H2H SERVICE TO COEXIST

CROSS-REFERENCE TO RELATED APPLICATION(S)

This application is the U.S. National Phase application of PCT application number PCT/CN2014/072788 having a PCT filing date of Mar. 3, 2014, which claims priority of Chinese patent application 201310561316.3 filed on Nov. 12, 2013, the disclosures of which are hereby incorporated by reference.

TECHNICAL FIELD

The present document relates to the technical field of the wireless communication, and in particular, to a method and apparatus for a coexistence of a machine to machine (M2M) service and a human to human (H2H) service.

BACKGROUND OF RELATED ART

The M2M and H2H service platform can provide a convenience for development, access, publish and subscription of the service by building a management and service platform between a terminal and an application. The architecture of the M2M and H2H service platform relates to three parts: a terminal side, an M2M and H2H service platform, and an application side. The terminal side further includes a perception node, a terminal and a gateway. The application side serves for various networks, including personal application, enterprise application and public infrastructure service, etc. The M2M and H2H service platform serves as a core part therein, of which the functions include providing unified access interfaces for the terminal side and the application side, providing a carrying link for implementing the service, uniformly managing the terminal, the application and the link resources, and guaranteeing the security of implementing the services.

Because current strategies for the coexistence of the M2M service and the H2H service all adopt the strategy that the H2H service is prior, that is, the low level M2M service is disconnected when the H2H service is busy, and because the repetitive disconnection and connection would cause the congestion of the server, the strategy for the coexistence of M2M service and H2H service which is based on a Quality of Service (QoS) negotiation is still absent.

SUMMARY

The embodiments of the present document provide a method and an apparatus for a coexistence of an M2M service with an H2H service, which solve the problem that the congestion of the server would be caused because of the repeated disconnections and connections in the related art.

According to one aspect of the embodiments of the present document, a method for a coexistence of an M2M service with an H2H service is provided, comprising:

during an implementation of an M2M service, determining whether the M2M service is a QoS negotiable M2M service by checking a type of the M2M service;

when determining that the M2M service is a QoS negotiable M2M service, making the M2M service and the H2H service to share same network resources;

when determining that the M2M service is a QoS non-negotiable M2M service, configuring, for the M2M service, a dedicated cell dedicated to implement the M2M service; and wherein, the M2M service is a machine to machine service, and the H2H service is a human to human service.

Alternatively, said checking a type of the M2M service comprises:

checking a flag of one mapping corresponding to the M2M service in a pre-established mapping table of an M2M terminal and an M2M application, wherein, the flag represents that the M2M service is of a QoS negotiable type or represents that the M2M service is of a QoS non-negotiable type.

Alternatively, said determining whether the M2M service is a QoS negotiable M2M service comprises:

if it is found, by checking, that the flag represents that the M2M service is of the QoS negotiable type, then determining that the M2M service is the QoS negotiable M2M service; and if it is found, by checking, that the flag represent that the M2M service is of the QoS non-negotiable type, then determining that the M2M service is the QoS non-negotiable M2M service.

Alternatively, the method further comprises:

receiving a registration request of a QoS parameter of the M2M service provided by the M2M application;

classifying the M2M services of the M2M application into various types by whether the QoS parameter is of a negotiable type; and classifying the M2M services of the M2M terminal into various types according to the M2M services of the M2M application by establishing the mapping table of the M2M terminal and the M2M application.

Alternatively, said making the M2M service and the H2H service to share same network resources comprises:

when an implementation of the H2H service is idle and there are idle network resources, implementing the M2M service by using the idle network resources; and when the implementation of the H2H service is busy and there is no idle network resource, the M2M service entering a waiting stage; and when the implementation of the H2H service is idle and there are idle network resources, then implementing the M2M service by using the idle network resources.

Alternatively, said configuring, for the M2M service, a dedicated cell dedicated to implement the M2M service comprises:

configuring, for the M2M service, an independent gateway general packet radio service (GPRS) support node (GGSN) dedicated to implement the M2M service.

According to another aspect of the embodiment of the present document, an apparatus for a coexistence of a M2M service and a H2H service is provided, comprising:

a determination module, configured to: during an implementation of an M2M service, determine whether the M2M service is a Quality of Service (QoS) negotiable M2M service by checking a type of the M2M service;

a processing module, configured to: when determining that the M2M service is the QoS negotiable M2M service, make the M2M service and the H2H service to share same network resources; when determining that the M2M service is a QoS non-negotiable M2M service, configure, for the M2M service, a dedicated cell dedicated to implement the M2M service; and wherein, the M2M service is a machine to machine service, and the H2H service is a human to human service._

Alternatively, the determination module comprises:

a checking unit, configured to: check a flag of one mapping corresponding to the M2M service in a pre-established mapping table of an M2M terminal and an M2M application, wherein, the flag represents that the M2M service is of a QoS negotiable type or represents that the M2M service is of a QoS non-negotiable type.

Alternatively, the determination module further comprises:

a determination unit, configured to: when it is found, by checking, that the flag represents that the M2M service is of the QoS negotiable type, then determine that the M2M service is the QoS negotiable M2M service; and when it is found, by checking, that the flag represents that the M2M service is of the QoS non-negotiable type, then determine that the M2M service is the QoS non-negotiable M2M service.

Alternatively, the apparatus further comprises:

a registration request receiving unit, configured to: receive a registration request of a QoS parameter of the M2M service provided by the M2M application; and a classification unit, configured to: classify the M2M services of the M2M application into various types by whether the QoS parameter is of the negotiable type, and classify the M2M services of the M2M terminal into various types according to the M2M services of the M2M application by establishing the mapping table of the M2M terminal and the M2M application.

Compared to the related art, the beneficial effect of the embodiments of the present document is that:

the embodiment of the present document classifies the registered M2M services by providing the registered M2M services with whether the equant QoS is negotiable and adopts different coexistence strategies with the H2H service, the QoS negotiable M2M service makes full use of the idle resources of the H2H service and the QoS non-negotiable M2M service then gets the dedicated cell, thus making full use of the network resources, guaranteeing the QoS in the process of implementing the service, and eliminating the repeated access and congestion possibly caused by that.

PREFERRED EMBODIMENTS

The preferred embodiments of the present document are described in detail with reference to the accompanying drawings hereinafter. It should be understood that, the preferred embodiments illustrated hereinafter are only used to describe and explain the present document, rather than constituting an inappropriate limitation to the present document. It should be illustrated that, in the case of not conflicting, the embodiments and features of these embodiments in the present application can be combined with each other.

Figure 1:
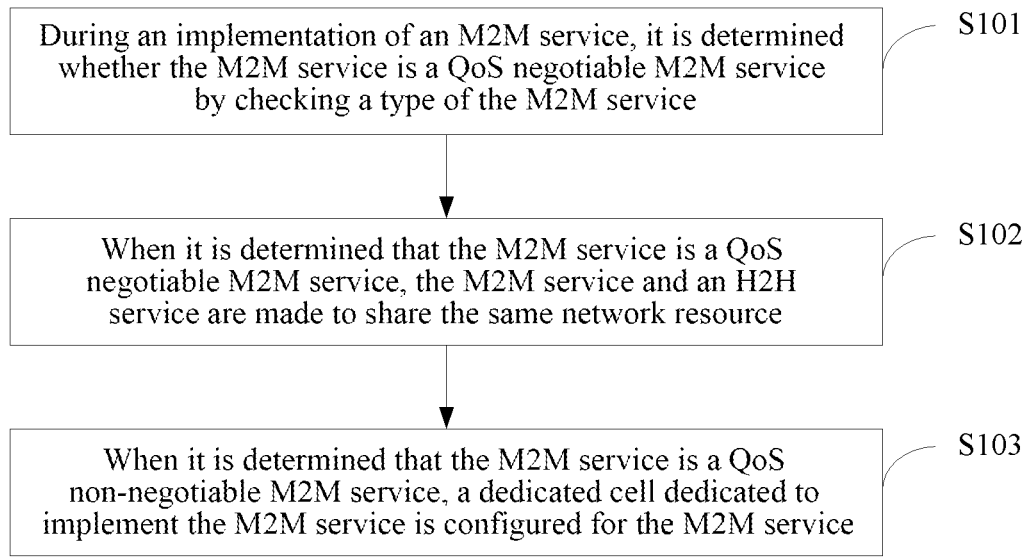
FIG. 1 is a flow chart of a method for a coexistence of an M2M service and an H2H service provided by an embodiment of the present document.

FIG. 1 shows a flow chart of a method for a coexistence of an M2M service and an H2H service provided by an embodiment of the present document, as shown in FIG. 1, including the following steps:

in step S101, during an implementation of an M2M service, it is determined whether the M2M service is a QoS negotiable M2M service by checking a type of the M2M service;

in step S102, when it is determined that the M2M service is a QoS negotiable M2M service, the M2M service and an H2H service are made to share same network resources;

in step S103, when it is determined that the M2M service is a QoS non-negotiable M2M service, a dedicated cell dedicated to implement the M2M service is configured for the M2M service;

wherein, the M2M service is a machine to machine service, and the H2H service is a human to human service.

Preferably, checking the type of the M2M service includes: checking a flag of one mapping corresponding to the M2M service in a pre-established mapping table of an M2M terminal and an M2M application, wherein, the flag represents that the M2M service is of a QoS negotiable type or represents that the M2M service is of a QoS non-negotiable type.

Preferably, determining whether the M2M service is a QoS negotiable M2M service includes: if it is found by checking that the flag represents that the M2M service is of the QoS negotiable type, then determining that the M2M service is the QoS negotiable M2M service; if it is found by checking that the flag represents that the M2M service is the QoS non-negotiable type, then determining that the M2M service is the QoS non-negotiable M2M service.

The embodiment of the present document further includes: receiving a registration request of a QoS parameter of the M2M service provided by the M2M application; classifying the M2M services of the M2M application into various types by whether the QoS parameter is of a negotiable type; classifying the M2M services of the M2M terminal into various types according to the M2M services of the M2M application by establishing a mapping table of the M2M terminal and the M2M application.

Wherein, making the M2M service and the H2H service to share same network resources includes: when an implementation of the H2H service is idle and there are idle network resources, implementing the M2M service by using the idle network resources; when the implementation of the H2H service is busy and there is no idle network resources, the M2M service entering a waiting stage; and when the implementation of the H2H service is idle and there are idle network resources, then implementing the M2M service by using the idle network resources.

Wherein, configuring, for the M2M service, a dedicated cell dedicated to implement the M2M service includes: configuring, for the M2M service, an independent gateway general packet radio service (GPRS) support node (GGSN) dedicated to implement the M2M service.

Figure 2:
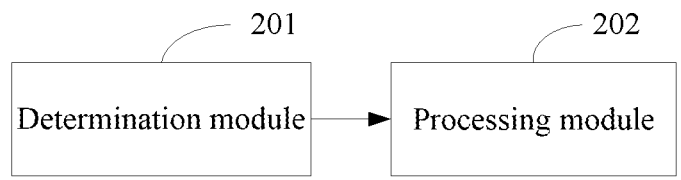
FIG. 2 is a diagram of an apparatus for a coexistence of an M2M service and an H2H service provided by an embodiment of the present document.

FIG. 2 shows a diagram of an apparatus for a coexistence of an M2M service and an H2H service provided by an embodiment of the present document, as shown in FIG. 2, including: a determination module 201, configured to: during an implementation of an M2M service, determine whether the M2M service is a Quality of Service (QoS)

negotiable M2M service by checking a type of the M2M service; a processing module 202, configured to: when determining that the M2M service is a QoS negotiable M2M service, make the M2M service and the H2H service to share same network resources; when determining that the M2M service is a QoS non-negotiable M2M service, configure, for the M2M service, a dedicated cell dedicated to implement the M2M service; wherein, the M2M service is a machine to machine service, and the H2H service is a human to human service.

Wherein, the determination module 201 includes: a checking unit, configured to: check a flag of one mapping corresponding to the M2M service in a pre-established mapping table of an M2M terminal and an M2M application, wherein, the flag either represents that the M2M service is of a QoS negotiable type or represents that the M2M service is of a QoS non-negotiable type; a determination unit, configured to: when it is found by checking that the flag represents that the M2M service is of the QoS negotiable type, then determine that the M2M service is the QoS negotiable M2M service; and when it is found by checking that the flag represents that the M2M service is of the QoS non-negotiable type, then determine that the M2M service is the QoS non-negotiable M2M service.

The embodiment of the present document further includes: a registration request receiving unit, configured to: receive a registration request of a QoS parameter of the M2M service provided by an M2M application; a classification unit, configured to: classify the M2M services of the M2M application into various types by whether the QoS parameter is negotiable, and classify the M2M services of the M2M terminal into various types according to the M2M services of the M2M application by establishing the mapping table of the M2M terminal and the M2M application.

Figure 3:
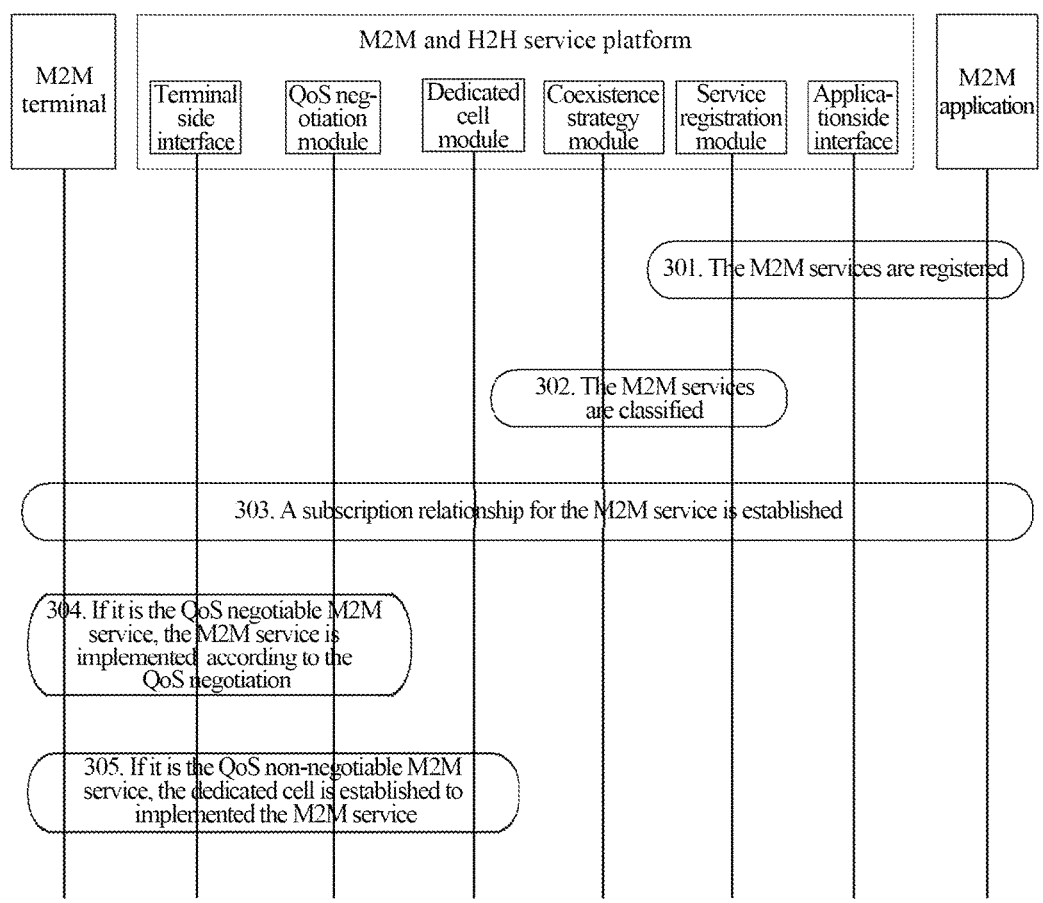
FIG. 3 is a flow chart of implementing an M2M service by using an apparatus for a coexistence of an M2M service and an H2H service provided by an embodiment of the present document.

FIG. 3 shows a flow chart of implementing an M2M service by using an apparatus for a coexistence of an M2M service and an H2H service provided by an embodiment of the present document. As shown in FIG. 3, the flow mainly includes the following steps:

in step 301, the M2M services are registered to the M2M and H2H service platform through an interface of the application side;

when the M2M service publishes an application, the M2M service is registered to the service registration module of the M2M and H2H service platform; during the registration process, the M2M and H2H service platform would require the M2M service to provide a QoS parameter of implementing the service and declare whether the QoS parameter is negotiable.

In step 302, the M2M services are classified according to whether the QoS parameter is QoS negotiable;

a coexistence strategy module classifies the registered M2M services according to whether the QoS parameter is QoS negotiable, to form different types of M2M service databases and prepare for later strategy establishment and service implementation.

Wherein, the QoS negotiation refers to the QoS parameter as an interval, during the implementation of the service, it can also satisfy the requirements for the M2M service by properly reducing the QoS parameter, for example, uploading the data, such as, monitoring the life parameter and monitoring the environment, etc., which do not require a high real-time and can be selected to implement when the H2H service is idle.

In step 303, a subscription relationship of the M2M service is established;

before carrying out the M2M service, the M2M terminal establishes the subscription relationship of the M2M service with the M2M application through the M2M and H2H service platform, to form a mapping table of the M2M terminal to the M2M application; each mapping has the flag about whether the QoS is negotiable in step 301, and different implementation strategies are adopted according to whether the QoS is negotiable in the process of implementing the service.

In step 304, if it is the QoS negotiable M2M service, the M2M service is implemented according to the QoS negotiation;

according to the implementation strategy established by the coexistence strategy server, for the QoS negotiable M2M service, the QoS negotiation strategy is adopted in the implementation process, it is enhanced to monitor the process of implementing the H2H service, the usage situation of the network resources by the H2H service is observed, and the implementation of the M2M service is delayed or the M2M service is implemented with the QoS being reduced when the H2H service is busy, which guarantees the implementation of the H2H service. That is, the QoS negotiable M2M service adopts the implementation strategy to coexist with the H2H service, and the M2M service is implemented in the time period during which the H2H service is idle according to the QoS negotiation mechanism.

In step 305, if it is the QoS non-negotiable M2M service, the dedicated cell is established to implement the M2M service.

According to the execution strategy established by the coexistence strategy module, for the QoS non-negotiable M2M service, the M2M and H2H service platform establishes the dedicated cell for its implementation, and the dedicated cell configures an independent Gateway GPRS Support Node (GGSN) for the M2M service to guarantee that the QoS would not be influenced by the H2H service during the process of implementing the M2M service.

Figure 4:
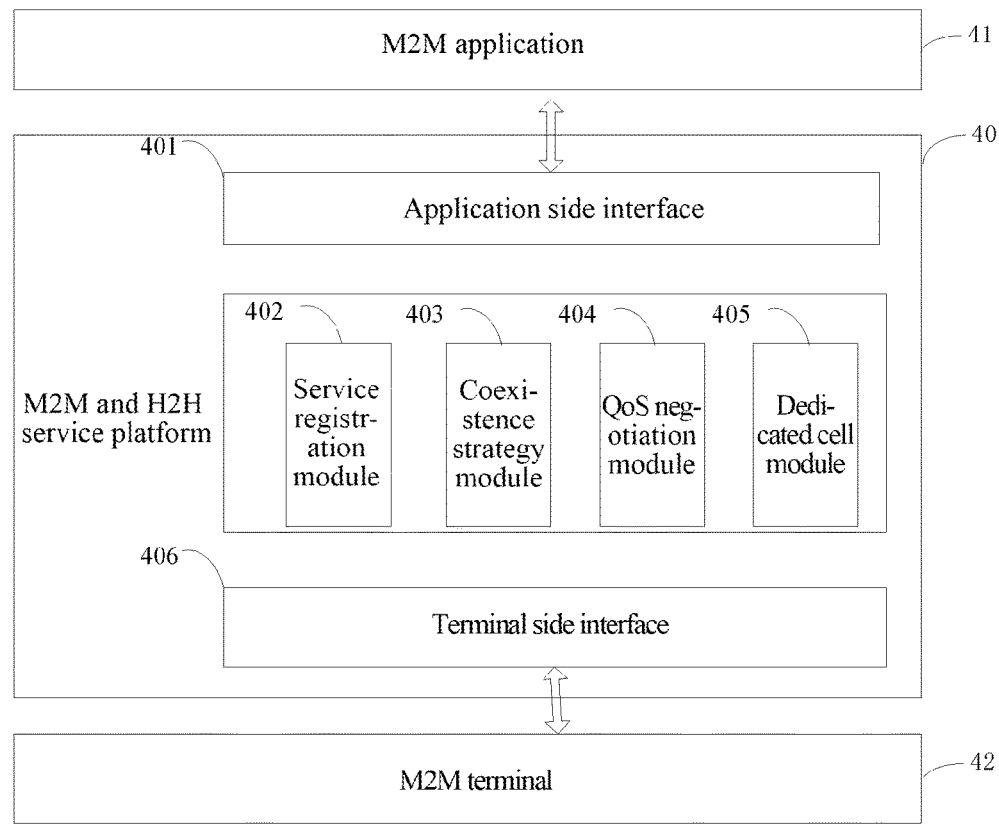
FIG. 4 is a structure diagram of an apparatus for a coexistence of an M2M service and an H2H service provided by an embodiment of the present document.

FIG. 4 shows a structure diagram of an apparatus for a coexistence of an M2M service and an H2H service provided by an embodiment of the present document, as shown in FIG. 4, running on an M2M and H2H service platform 40, to realize the coexistence implementation of the M2M service and the H2H service. The M2M and H2H service platform 40 is located between an M2M application 41 and an M2M terminal 42. The M2M and H2H service platform 40 includes an application side interface 401, a service registration module 402, a coexistence strategy module 403, a QoS negotiation module 404, a dedicated cell module 405 and a terminal side interface 406.

Wherein, the M2M and H2H service platform 40 is configured to: take charge of the registration and classification of the M2M services, establish the coexistence strategy of the M2M service with the H2H service, and implement the M2M service according to the established strategy.

Preferably, the application side interface 401 is configured to: respond to the registration request of the M2M application 41, and take charge of the communication between the M2M and H2H service platform 40 and the M2M application 41; the terminal side interface 406 is configured to: respond to the access request of the M2M terminal 42, and take charge of the communication between the M2M and H2H service platform 40 and the M2M terminal 42; the service registration module 402 is configured to: accept the registration of the M2M service, and organize the application server to fill out the registration information when the M2M service is registered. What is especially important is the requirement of the M2M service on the QoS parameter (time delay, band width, packet loss rate, etc.) and whether the QoS negotiation can be performed; the coexistence strategy module 403 is configured to: establish the coexistence strategy. The M2M services are classified according to whether the QoS is negotiable, according to the QoS information of the M2M service collected by the service registration module 402. And different coexistence strategies are established for different M2M services. The QoS negotiable M2M service would share the network resources with the H2H service, and the M2M service is implemented on the basis of guaranteeing the H2H service; a dedicated cell would be configured for the QoS non-negotiable M2M service, to guarantee the implementation quality of the M2M service and avoid causing influence on the H2H service. The QoS negotiation module 404 is configured to: after establishing the service subscription relationship, take charge of the QoS negotiation in the implementation process for the QoS negotiable M2M service, and not implement the M2M service temporarily when the H2H service is busy and there is no idle network; and implement the M2M service by using its idle network resources as long as the H2H service is idle; the dedicated cell module 405 is configured to: configure dedicated network resources, independent gateway servers, etc., for the QoS non-negotiable M2M service according to the requirement of the QoS after establishing the service subscription relationship, to guarantee the QoS in the process of implementing the M2M service.

Figure 5:
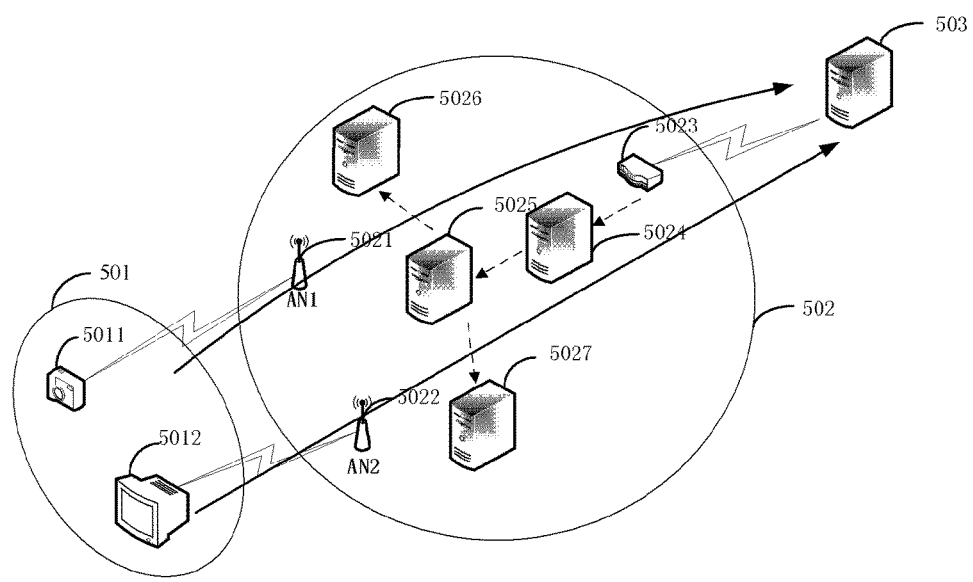
FIG. 5 is a diagram of realizing a coexistence of an M2M service and an H2H service provided by an embodiment of the present document.

FIG. 5 shows a diagram of realizing a coexistence of an M2M service and an H2H service provided by an embodiment of the present document, as shown in FIG. 5, including: a terminal 501, an M2M and H2H service platform 502 and an application server 503. Wherein, the terminal 501 includes: a monitoring terminal 5011 and a monitoring terminal 5012; The M2M and H2H service platform 502 includes: an AN1 access point 5021, an AN2 access point 5022, an application access router 5023, an M2M service registration server 5024, a coexistence strategy server 5025, a QoS negotiation server 5026 and an independent GGSN server 5027.

The application server 503 registers the M2M service to the M2M service registration server 5024 of the M2M and H2H service platform 502 through the application access router 5023. The M2M services can be divided into two types according to whether they are QoS negotiable. The typical applications which are QoS negotiable are life parameters (the usage situation of the utilities, etc.), environmental monitoring, etc., which do not have significant requirements on real-time, etc., and it can select to implement the service transmission when the H2H service is idle; the typical applications which are QoS non-negotiable are safety production monitoring, health supervision and encroachment warning, etc. The coexistence strategy server 5025 of the M2M service and the H2H service establishes different implementation strategies for different services according to the different service types. After the terminal 501 establishes the subscription relationship with the application server 503, if it is the QoS negotiable service, the data generated by the monitoring terminal 5011 arrive at the application server 503 through the AN1 access point 5021; and the QoS negotiation server 5026 takes charge of the negotiation with the H2H service in the process of implementing the service, to make full use of the idle network resources to implement the M2M service in the case of guaranteeing not to influence the H2H service; if it is the QoS non-negotiable M2M service, the data generated by the monitoring terminal 5012 arrive at the application server 503 through the AN2 access point 5022 via the independence GGSN server 5027, and that process is not influenced by the H2H service, to guarantee the QoS of the M2M service.

To sum up, the embodiment of the present document classifies the M2M services according to whether they are QoS negotiable while the M2M services are registered by adding a service registration module and a coexistence strategy module. Meanwhile, by adding a QoS negotiation module and a dedicated cell module, for the M2M service which is QoS negotiable, the QoS negotiation with the H2H service is realized in the implementation process; for the M2M service which is QoS non-negotiable, a dedicated cell is configured to guarantee the QoS in the process of implementing the service. It guarantees the QoS of the M2M service, avoids the repeated disconnection and connection processes which are caused because the QoS cannot be satisfied, meanwhile, it also realizes that the QoS negotiable M2M service and the H2H service share the core network and makes full use of the network resources of the M2M and H2H service platform.

To sum up, the embodiment of the present document has the following technical effects:

the embodiments of the present document consider the important influence on the implementation of the M2M service by different requirements of the QoS, implement the M2M service through the QoS negotiation, and can make full use of the network resources; meanwhile, configure the dedicated cell for the QoS non-negotiable M2M service to avoid the congestion caused by the repeated access.

Obviously, it can be understood by those skilled in the art that each module or each step above-mentioned in the present document can be implemented by the universal calculating apparatus, and they can be integrated in a single calculating apparatus, or distributed in the network composed of a plurality of calculating apparatus. Alternatively, they can be implemented by the executable program codes of the calculating apparatus. Accordingly, they can be stored in the storage apparatus and implemented by the calculating apparatus, and in some cases, the steps shown or described can be implemented in the orders different from here, or they are made into each integrated circuit module respectively, or a plurality of modules or steps therein are made into the single integrated circuit module to be implemented. In this way, the present document is not limit to any specific form of the combination of the hardware and software.

Although the above has described the present document in detail, the present document is not limited here. Those skilled in the art can make various modifications according to the principles of the present document. Therefore, and all the modifications made according to the principles of the present document should be understood to be embodied within the protection scope of the present document.

INDUSTRIAL APPLICABILITY

The embodiment of the present document classifies the registered M2M services by providing the registered M2M services with whether the equant QoS is negotiable and adopts different coexistence strategies with the H2H service, the QoS negotiable M2M service makes full use of the idle resources of the H2H service and the QoS non-negotiable M2M service then gets the dedicated cell, thus making full use of the network resources, guaranteeing the QoS in the process of implementing the service, and eliminating the repeated access and congestion possibly caused by that.

What is claimed is:

1. A method for a coexistence of a machine to machine (M2M) service and a human to human (H2H) service, comprising:

during an implementation of the M2M service, determining whether the M2M service is a Quality of Service (QoS) negotiable M2M service by checking a type of the M2M service;

when determining that the M2M service is the QoS negotiable M2M service, making the M2M service and the H2H service to share same network resources;

when determining that the M2M service is a QoS non-negotiable M2M service, configuring, for the M2M service, a dedicated cell dedicated to implement the M2M service; and wherein, the M2M service is a machine to machine service, and the H2H service is a human to human service.

2. The method according to claim 1, wherein, said checking a type of the M2M service comprises:

checking a flag of one mapping corresponding to the M2M service in a pre-established mapping table of an M2M terminal and an M2M application, wherein, the flag represents that the M2M service is of a QoS negotiable type or represents that the M2M service is of a QoS non-negotiable type.

3. The method according to claim 2, wherein, said determining whether the M2M service is a QoS negotiable M2M service comprises:

if it is found, by checking, that the flag represents that the M2M service is of the QoS negotiable type, then determining that the M2M service is the QoS negotiable M2M service; and if it is found, by checking, that the flag represents that the M2M service is of the QoS non-negotiable type, then determining that the M2M service is the QoS non-negotiable M2M service.

4. The method according to claim 2, further comprising:

receiving a registration request of a QoS parameter of the M2M service provided by the M2M application;

classifying the M2M services of the M2M application into various types by whether the QoS parameter is of a negotiable type; and classifying the M2M services of the M2M terminal into various types according to the M2M services of the M2M application by establishing the mapping table of the M2M terminal and the M2M application.

5. The method according to claim 1, wherein, said making the M2M service and the H2H service to share same network resources comprises:

when an implementation of the H2H service is idle and there are idle network resources, implementing the M2M service by using the idle network resources; and when the implementation of the H2H service is busy and there is no idle network resource, the M2M service entering a waiting stage; and when the implementation of the H2H service is idle and there are idle network resources, then implementing the M2M service by using the idle network resources.

6. The method according to claim 1, wherein, said configuring, for the M2M service, a dedicated cell dedicated to implement the M2M service comprises:

configuring, for the M2M service, an independent gateway general packet radio service (GPRS) support node (GGSN) dedicated to implement the M2M service.

7. An apparatus for a coexistence of a machine to machine (M2M) service and a human to human (H2H) service, comprising:

a determination module, configured to: during an implementation of an M2M service, determine whether the M2M service is a Quality of Service (QoS) negotiable M2M service by checking a type of the M2M service;

a processing module, configured to: when determining that the M2M service is the QoS negotiable M2M service, make the M2M service and the H2H service to share same network resources; when determining that the M2M service is a QoS non-negotiable M2M service, configure, for the M2M service, a dedicated cell dedicated to implement the M2M service; and wherein, the M2M service is a machine to machine service, and the H2H service is a human to human service.

8. The apparatus according to claim 7, wherein, the determination module comprises:

a checking unit, configured to: check a flag of one mapping corresponding to the M2M service in a pre-established mapping table of an M2M terminal and an M2M application, wherein, the flag represents that the M2M service is of a QoS negotiable type or represents that the M2M service is of a QoS non-negotiable type.

9. The apparatus according to claim 8, wherein, the determination module further comprises:

a determination unit, configured to: when it is found, by checking, that the flag represents that the M2M service is of the QoS negotiable type, then determine that the M2M service is the QoS negotiable M2M service; and when it is found, by checking, that the flag represents that the M2M service is of the QoS non-negotiable type, then determine that the M2M service is the QoS non-negotiable M2M service.

10. The apparatus according to claim 8, further comprising:

a registration request receiving unit, configured to: receive a registration request of a QoS parameter of the M2M service provided by the M2M application; and a classification unit, configured to: classify the M2M services of the M2M application into various types by whether the QoS parameter is of the negotiable type, and classify the M2M services of the M2M terminal into various types according to the M2M services of the M2M application by establishing the mapping table of the M2M terminal and the M2M application.

11. The method according to claim 2, wherein, said making the M2M service and the H2H service to share same network resources comprises:

when an implementation of the H2H service is idle and there are idle network resources, implementing the M2M service by using the idle network resources; and when the implementation of the H2H service is busy and there is no idle network resource, the M2M service entering a waiting stage; and when the implementation of the H2H service is idle and there are idle network resources, then implementing the M2M service by using the idle network resources.

12. The method according to claim 3, wherein, said making the M2M service and the H2H service to share same network resources comprises:

when an implementation of the H2H service is idle and there are idle network resources, implementing the M2M service by using the idle network resources; and when the implementation of the H2H service is busy and there is no idle network resource, the M2M service entering a waiting stage; and when the implementation of the H2H service is idle and there are idle network resources, then implementing the M2M service by using the idle network resources.

13. The method according to claim 4, wherein, said making the M2M service and the H2H service to share same network resources comprises:

when an implementation of the H2H service is idle and there are idle network resources, implementing the M2M service by using the idle network resources; and when the implementation of the H2H service is busy and there is no idle network resource, the M2M service entering a waiting stage; and when the implementation of the H2H service is idle and there are idle network resources, then implementing the M2M service by using the idle network resources.

14. The method according to claim 2, wherein, said configuring, for the M2M service, a dedicated cell dedicated to implement the M2M service comprises:

configuring, for the M2M service, an independent gateway general packet radio service (GPRS) support node (GGSN) dedicated to implement the M2M service.

15. The method according to claim 3, wherein, said configuring, for the M2M service, a dedicated cell dedicated to implement the M2M service comprises:

configuring, for the M2M service, an independent gateway general packet radio service (GPRS) support node (GGSN) dedicated to implement the M2M service.

16. The method according to claim 4, wherein, said configuring, for the M2M service, a dedicated cell dedicated to implement the M2M service comprises:

configuring, for the M2M service, an independent gateway general packet radio service (GPRS) support node (GGSN) dedicated to implement the M2M service.

17. The method according to claim 5, wherein, said configuring, for the M2M service, a dedicated cell dedicated to implement the M2M service comprises:

configuring, for the M2M service, an independent gateway general packet radio service (GPRS) support node (GGSN) dedicated to implement the M2M service.

* * * * *